United States Patent [19]

Marshall et al.

[11] Patent Number: 5,057,593

[45] Date of Patent: Oct. 15, 1991

[54] FREE RADICAL COPOLYMERIZATION OF ETHYLENE AND CO WITH ACETONE

[75] Inventors: Donald R. Marshall, Orange, Tex.; Robert J. Statz, Kennett Square, Pa.; James D. White, Port Neches, Tex.

[73] Assignee: E. I. Du Pont de Nemours and Company, Wilmington, Del.

[21] Appl. No.: 535,671

[22] Filed: Jun. 11, 1990

[51] Int. Cl.$^5$ .............................................. C08G 67/02
[52] U.S. Cl. .................................... 528/271; 528/392
[58] Field of Search ................................ 528/271, 392

[56] References Cited

U.S. PATENT DOCUMENTS

| | | | |
|---|---|---|---|
| 2,495,286 | 1/1950 | Brubaker | 528/271 |
| 3,117,110 | 8/1965 | Madge et al. | 260/86.7 |
| 3,507,841 | 4/1970 | McDonald | 260/80.6 |
| 3,658,741 | 4/1972 | Knutson et al. | 260/29.6 |
| 3,714,123 | 1/1973 | Mancini et al. | 260/63 |
| 3,780,140 | 12/1973 | Hammer | 528/271 |
| 4,137,382 | 1/1979 | Vetter | 528/271 |
| 4,351,931 | 9/1982 | Armitage | 526/227 |
| 4,877,860 | 10/1989 | van Broekhoven | 528/392 |

*Primary Examiner*—Harold D. Anderson
*Attorney, Agent, or Firm*—Craig H. Evans

[57] ABSTRACT

An improvement in the process for the continuous copolymerization of ethylene with carbon monoxide and optionally certain polar comonomers having reactive double bonds, wherein a single phase is maintained in the reactor by means of acetone introduced concurrently with the reactants, whereby reactor fouling is significantly reduced or eliminated.

11 Claims, No Drawings

FREE RADICAL COPOLYMERIZATION OF ETHYLENE AND CO WITH ACETONE

BACKGROUND OF THE INVENTION

Continuous copolymerization of ethylene with carbon monoxide and other comonomers is well known in the art. Two types of reactors which are widely used are tubular reactors and stirred tank reactors. Such reactors are quite different in their dimensions, and hence in the environment and state of motion of the reacting mixture. The nature of polymers made from these different types of reactors is described in Armitage, U.S. Pat. No. 4,351,931 for ethylene-methacrylic acid copolymers, which is hereby incorporated by reference.

For the production of random uniform copolymers in a continuous stirred tank reactor, it is desirable to keep the polymerizing mixture in one phase. Increasing the temperature and/or pressure for any monomer mix will decrease the likelihood of separating the mix into two phases. However, when the copolymerization is carried out in internally stirred reactors, the highly polar comonomers result in build up of polymer deposits on the inner surfaces of the reactor far more readily than with non-polar monomers, and at temperatures and pressures at which little or no deposits would occur with non-polar monomers. These deposits may be related to localized phase separation in localized colder regions of the polymerization kettle, such as the monomer inlet region or stirrer seal region.

The formation of these deposits adversely affects the stable operation of the reactor. In addition, with the passage of time, the deposits thermally crosslink to form an intractable gel. As gel particles subsequently are released from the reactor surfaces by the combined action of the shear of the stirrer and the flow of monomers through the vessel, the presence of those crosslinked particles in the copolymer tends to compromise the quality of the copolymer produced.

Comonomers with reactivities substantially equivalent to ethylene, such as vinyl acetate, normally will not exhibit this effect. There, the relative proportion of each monomer incorporated into the polymer is similar to that of the monomer mix. In a continuous reactor operating under steady conditions, this means the composition of the monomer mix will be similar to that of monomers polymerized into the polymer. The polarity of the polymer will tend to be similar to that of the monomer mix, which substantially reduces the likelihood of reactor fouling.

Various methods have been proposed to solve the problem of reactor fouling, including periodic reactor scraping or the addition of an adhesion inhibitor. However, none of the solutions previously suggested provides the desired combination of high production rates and the applicability to comonomers having significantly different rates of reaction.

A need therefore exists for a process for the copolymerization of ethylene with highly reactive comonomers in which a single phase is maintained in the reactor, with the result that polymer separation or deposition on the inner parts of reactor vessel is prevented.

SUMMARY OF THE INVENTION

According to the present invention, there is provided, in a process for the continuous copolymerization of ethylene with carbon monoxide and up to about 40 weight percent of at least one comonomer selected from the group consisting of
  (a) alpha-beta unsaturated carboxylic acids having 3 to 8 carbon atoms,
  (b) esters and glycidyl esters of the above (a) acids with $C_1-C_8$ alcohols and with phenols and naphthols having up to 2 alkyl substituents of 1–4 carbon atoms,
  (c) anhydrides of the above (a) acids, and
  (d) vinyl esters of saturated aliphatic acids having 2–4 carbon atoms,
wherein the resulting copolymer contains about 15–95 weight percent of copolymerized ethylene, the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes, and recovering the copolymer from the reactor effluent, the improvement which comprises introducing into the copolymerization reactor a solvent consisting of at least about 50% acetone, the solvent comprising about 2–20 weight percent of the total material flowing through the reactor.

DETAILED DESCRIPTION OF THE INVENTION

In accordance with the present invention ethylene is copolymerized with carbon monoxide and optionally one or more other comonomer. As used herein, the term "copolymerization" means reaction with one or more comonomers to give dipolymers, terpolymers and the like. The process of the present invention is generally applicable to the preparation of copolymers containing 15–95 weight percent of ethylene, and preferably 30–90 weight percent ethylene.

In accordance with the present invention, ethylene is copolymerized with carbon monoxide. In general, about from 3 to 25 weight % carbon monoxide is so incorporated.

The comonomers with which the ethylene is copolymerized can also include one or more selected from
  (a) alpha-beta unsaturated carboxylic acids having 3 to 8 carbon atoms,
  (b) esters and glycidyl esters of the above (a) acids with $C_1-C_8$ alcohols and with phenols and naphthols having up to 2 alkyl substituents of 1–4 carbon atoms, and
  (c) anhydrides of the above (a) acids, and
  (d) vinyl esters of saturated aliphatic acids having 2–4 carbon atoms.

Representative of these comonomers are alpha-beta unsaturated carboxylic acids having 3–8 carbon atoms, such as methacrylic acid, acrylic acid, maleic acid, fumaric acid and itaconic acid; esters and glycidyl esters of the above acids with $C_1-C_8$ alcohols and with phenols and naphthols having up to 2 alkyl substituents of 1–4 carbon atoms, such as methyl acrylate, ethyl acrylate, methyl methacrylate, ethyl methacrylate, butyl acrylate, isobutyl acrylate, pentyl acrylate, hexyl acrylate, 2-ethylhexyl acrylate, 2-ethylhexyl methacrylate, glycidyl methacrylate, phenyl acrylate, 4-methylphenyl acrylate, naphthyl acrylate, methyl hydrogen maleate, ethyl hydrogen maleate, and ethyl hydrogen itaconate; and anhydrides of the above acids, such as maleic anhydride, acrylonitrile, and methacrylonitrile.

Other comonomers which can be used are vinyl esters of saturated acids having 2-4 carbon atoms, of which vinyl acetate is particularly preferred.

Two particularly preferred ethylene copolymers that can be prepared by this process are those prepared from ethylene, carbon monoxide and vinyl acetate, and ethylene, carbon monoxide and n-butyl acrylate.

The monomers to be copolymerized are typically introduced into the copolymerization reactor with at least one free-radical copolymerization initiator, according to known copolymerization techniques. Typical copolymerization initiators which can be used include peroxygen compounds such as lauryl peroxide, tert-butyl peracetate, tert-butyl peroxypivalate, di-tert-butyl peroxide, di(sec-butyl) peroxydicarbonate, as well as tert-butyl peroctoate. Other free radical initiators which can be used include azobis compounds such as, e.g., azobisisobutyronitrile. The choice of initiator will depend on the copolymerization temperature since each initiator has its own decomposition temperature, at which it efficiently generates free radicals. In general, the initiator is present in an amount of about from 0.0001 to 0.1 moles per 1000 pounds of polymer products.

The copolymerization temperature is generally maintained at about from to 300° C., and preferably about from 140° C. to 260° C. The pressure is generally maintained at about from 130 to 310 MPa, and preferably within the range of about from 165 to 240 MPa.

A central feature of the present invention is the use of acetone as a solvent in the reaction. The acetone is present in an amount equal to about 2-20 percent by weight of the total material flowing through the reactor, and preferably about from 5 to 15 weight percent. Above about 20 weight percent of the solvent system in the materials flowing through the reactor, the monomer fraction of the reactor content can become diluted to the point that both the copolymerization rate and the molecular weight of the resulting copolymer would be adversely affected. Below about 2%, the cosolvent system often is not effective.

The solvent preferably consists essentially of acetone. In general, the total weight of solvent can comprise up to about 50 weight % of solvents other than acetone which do not adversely effect the performance of acetone. For example, some solvents previously used in the art for this type of polymerization can be used in combination with acetone in the instant process without detracting from the non-fouling benefits of the acetone. Such additional solvents include benzene and t-butyl benzene, both of which are substantially non-telogenic. That is, they do not reduce or 'regulate' the molecular weight of the polymer. Chain regulators or telogens often used in copolymerizations with polar monomers include small quantities of cyclohexane or other hydrocarbons such as propane.

In general, the solvent should be substantially free of alcohols such as methanol. When carbon monoxide is a component of the ethylene copolymer, alcohols can be incorporated into the polymer backbone and significantly alter the properties of the resulting copolymer.

The copolymerization is run as a continuous process in which ethylene, the carbon monoxide and any other comonomer, and the solvent system are continuously fed, together with initiator, into a stirred reactor, for example, an autoclave of the type disclosed in Christl et al., U.S. Pat. No. 2,897,183, hereby incorporated by reference. The rate of addition will depend on variables such as the polymerization temperature, pressure, monomers employed, and concentration of the monomers in the reaction mixture. The reaction mixture is continuously removed from the autoclave, and, after the reaction mixture leaves the reaction vessel, the resulting copolymer is separated from the volatile unchanged monomers and solvents by conventional means, e.g., by vaporizing the unpolymerized materials and solvents under reduced pressure and at an elevated temperature.

The process of this invention is operated so that a single phase is present in the copolymerization reactor substantially throughout the reactor. Accordingly, the amounts of comonomers and of solvent are adjusted to the type of comonomer or comonomers as well as to the operating conditions such as temperature, pressure, and rate of flow. Generally, the solvent permits the monomers and the copolymer to remain in the same phase in the reactor. The miscibility of those system components depends largely on their polarities and also on the amount of the polar comonomers relative to the amount of ethylene. Thus, for a higher concentration of polar comonomer or for a more polar comonomer, a larger amount of cosolvent may be required.

When the amount of comonomer in the ethylene copolymer is less than about 10% but especially when it is less than about 5%, the difference in polarity of the copolymer and the unchanged monomers is minimized, so that phasing out of the polymer is negligible. The process of this invention is the most useful in the case where the amount of copolymerized ethylene is at least about 30% of the copolymer.

Depending on the particular monomers used and their amounts, it may be desirable to add one or more conventional hydrocarbon chain transfer agents, such as propane, to adjust the molecular weight to the specific end use for which the copolymer is intended.

It is known that temperature, pressure and conversion affect the tendency to form a second phase. For example, increasing temperature and pressure help reduce fouling, but increasing temperature increases chain transfer and hence reduces molecular weight. By use of solvents according the present invention, combined with adjustment of these three conditions, reactor fouling can be substantially reduced or prevented with even the most polar and reactive monomers.

Copolymers resulting from the process of the present invention can be characterized by a broad spectrum of molecular weight.

Those having a low molecular weight, or high melt index of greater than about 100, can be used as adhesives. In applications for which a higher molecular weight is desired, such copolymers can be modified by a variety of known techniques. For example, acid copolymers, such as ethylene-carbon monoxide-(meth)acrylic acid, can be neutralized to form ionomers as discussed in Rees, U.S. Pat. No. 3,264,272, hereby incorporated by reference. Those copolymers not amenable to ionomerization can be lightly branched or cross-linked by known techniques to increase molecular weight to a desired level.

Copolymers having a high molecular weight can be further treated, if desired, to reduce molecular weight by the addition of telogens, as will be evident to those skilled in the art.

The present invention is further illustrated by the following examples, in which parts, proportions, and percentages other than yields or conversions are by weight unless otherwise indicated.

EXAMPLE 1 AND COMPARATIVE EXAMPLES A-B

In Example 1, a 750 ml steel continuous stirred reactor was repeatedly flushed with substantially dry gaseous ethylene of greater than 99.9% purity to remove residual oxygen from the system. The reactor body temperature was then raised to the goal temperature, about 175° C., using external heaters. Acetone was continuously pumped at a rate of 1.13 kg/hr through the stirrer seal and into the reactor.

Ethylene, compressed to approximately 186 MPa (1837 atm) and then cooled to 30° C., was continuously metered to the reactor at a rate of 6.36 kg/hr. The flow of ethylene was used to establish the reactor pressure at about 186 MPa (1837 atm).

The cool ethylene and solvent feeds lowered the temperature of the reactor contents below the desired temperature of 175° C. An initiator solution consisting of tert-butyl peroxypivalate, in a non-polar solvent, was maintained in a separate reservoir and pumped to the reactor at a temperature of about 30° C. Once polymerization was initiated, as evidenced by an increase in the internal reactor temperature, carbon monoxide, vinyl acetate and acetone were continuously metered to the reactor at a rates of 0.24, 3.08 and 1.13 kg/hr, respectively.

The total concentration of polar solvent in the reactor, from the stirrer seal flush and vinyl acetate solution was 10.18% by weight. The flow of the initiator was increased to raise the reactor internal temperature to 175° C. The reactor internal temperature was maintained by adjusting the initiator solution flow. The reactor internal temperature spread, as reported in Table I, is defined as the maximum difference between the temperatures indicated by four thermocouples equally spaced internally along the longitudinal direction of the reactor. Polymerization continued and steady state operation was obtained after about 1.3 hours. The system was maintained at steady state operation for 12 hours. At the end of that period the reaction was terminated, the reactor disassembled and examined for fouling by polymer deposits. None were found.

The copolymer, unreacted monomer, solvent, and impurities were continuously removed from the reactor. The copolymer was separated from the gaseous components by reducing the exit stream pressure from about 186 MPa to atmospheric pressure across a high pressure valve. The off-gas contained unreacted monomer along with acetone, as well as trace amounts of initiator and other normal impurities. The copolymer, containing small amounts of unchanged monomer, solvent, and other normal impurities, was collected and allowed to cool.

The resulting ethylene/carbon monoxide/vinyl acetate copolymer was a hard, clear, colorless, high molecular weight material. The copolymer had a melt index of 978 dg/min as determined by the appropriate procedure in ASTM D-1238.

The copolymer was evaluated according to standard procedures, and the results are summarized in Table I below.

In Comparative Examples A and B, the above procedure was substantially repeated, using the components and conditions also summarized in Table I. In these Comparative Examples, no acetone was used, and unacceptable reactor fouling resulted.

TABLE I

| Example | A | B | 1 |
|---|---|---|---|
| Temperature, deg. C. | 190 | 175 | 175 |
| Pressure, MPa | 186 | 186 | 186 |
| Ethylene, kg/hr | 6.36 | 6.36 | 6.36 |
| Vinyl Acetate, kg/hr | 3.27 | 3.21 | 3.08 |
| Carbon Monoxide, kg/hr | 0.24 | 0.25 | 0.24 |
| Propane, telogen, kg/hr | 0.27 | 0.32 | 0 |
| Total Acetone, kg/hr | 0 | 0 | 1.13 |
| Total tert-butyl benzene kg/hr | 0.30 | 0.52 | |
| Total Polar solvent, wt % | 0 | 0 | 10.18 |
| Initiator demand kg/1000 kg polymer | | | |
| t-butyl peroctoate | 1.538 | 0 | 0 |
| t-butyl peroxypivalate | 0 | 1.198 | 0.877 |
| Yield, kg/hr | 0.98 | 1.15 | 1.25 |
| Cop. melt index, dg/min | 39 | 27 | 978 |
| Steady state time, hrs | 11 | 12 | 12 |
| Avg. temp. spread deg. C. | 3.8 | 2.8 | 1.3 |
| Adhesions, mm. thick | | | <0.6 |
| | Moderate | Heavy | Clean |

EXAMPLE 2

The general procedure of Example 1 was repeated for the preparation of a terpolymer of ethylene, n-butyl acrylate and carbon monoxide. The resulting polymer was tested, and the test results, as well as the reaction conditions, are summarized in the following Table II.

TABLE II

| Example | 2 |
|---|---|
| Temperature, deg. C. | 160 |
| Pressure, MPa | 186 |
| Ethylene, kg/hr | 6.36 |
| n-Butyl Acrylate, kg/hr | 0.28 |
| Carbon Monoxide, kg/hr | 0.14 |
| Total Acetone, kg/hr | 0.49 |
| Total t-Butyl Benzene, kg/hr | 0.37 |
| Total polar solvent, wt. % | 6.38 |
| Total polar solvent except t-Butanol wt. % | 6.38 |
| di(sec-butyl) peroxydicarbonate | 0.232 |
| Yield, kg/hr | 0.380 |
| Copolymer melt index, dg/min | 17.3 |
| Polymer Composition, wt. % | |
| n-Butyl Acrylate | 31.7 |
| Carbon Monoxide | 10.2 |
| Total run time, hrs. | 67 |
| Steady state time, hrs. | 63 |
| Avg. reactor temperature spread, deg. C. | 2.2 |
| Adhesions, mm. thickness | — |
| | Trace |

We claim:

1. In a process for the continuous copolymerization of ethylene with carbon monoxide and up to about 40 weight percent of at least one comonomer selected from the group consisting of
   (a) alpha-beta unsaturated carboxylic acids having 3 to 8 carbon atoms,
   (b) esters and glycidyl esters of the above (a) acids with $C_1$-$C_8$ alcohols and with phenols and naphthols having up to 2 alkyl substituents of 1-4 carbon atoms,
   (c) anhydrides of the above (a) acids, and
   (d) vinyl esters of saturated aliphatic acids having 2-4 carbon atoms, wherein the resulting copolymer contains about 15-95 weight percent of copolymerized ethylene, the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes, and recovering the copolymer from the reactor effluent, the improvement which comprises introducing into the copolymerization reactor a solvent substantially free of alcohol, consisting of at least about 50% acetone, the solvent comprising about 2-20 weight percent of the total material flowing through the reactor.

2. A process of claim 1 wherein the amount of the solvent is about 5-15 weight percent of the total material flow.

3. A process of claim 1 wherein the solvent consists essentially of acetone.

4. A process of claim 1 wherein the copolymerization reactor maintained at a temperature of about from 140° C. to 260° C..

5. A process of claim 1 wherein the free-radical initiator is present in an amount of about from 0.0001 to 0.1 moles per 1000 pounds of resulting copolymer.

6. A process of claim 1 wherein the amount of ethylene in the copolymer is about 30-90 weight percent.

7. A process of claim 1 wherein the copolymerization reactor maintained at a pressure of about from 130 to 310 MPa.

8. A process of claim 7 wherein the copolymerization reactor maintained at a pressure of about 165 to about 240 MPa.

9. A process of claim 1 wherein the solvent further comprises up to about 50% of at least one compound selected from the group consisting of benzene and tertiary-butyl benzene.

10. A process of claim 1 wherein the process stream comprises about from 3 to 15 weight % carbon monoxide.

11. A process of claim 10 wherein the process stream further comprises about from 15 to 40 weight % n-butyl acrylate.

* * * * *